(12) United States Patent
Blightman et al.

(10) Patent No.: US 7,133,940 B2
(45) Date of Patent: Nov. 7, 2006

(54) NETWORK INTERFACE DEVICE EMPLOYING A DMA COMMAND QUEUE

(75) Inventors: Stephen E. J. Blightman, San Jose, CA (US); Daryl D. Starr, Milpitas, CA (US); Clive M. Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 883 days.

(21) Appl. No.: 09/855,979

(22) Filed: May 14, 2001

(65) Prior Publication Data

US 2001/0021949 A1   Sep. 13, 2001

Related U.S. Application Data

(63) Continuation of application No. 09/464,283, filed on Dec. 15, 1999, now Pat. No. 6,427,173, and a continuation of application No. 09/439,603, filed on Nov. 12, 1999, now Pat. No. 6,247,060, and a continuation of application No. 09/384,792, filed on Aug. 27, 1999, now Pat. No. 6,434,620, and a continuation of application No. 09/067,544, filed on Apr. 27, 1998, now Pat. No. 6,226,680, and a continuation of application No. 09/416,925, filed on Oct. 13, 1999, now Pat. No. 6,470,415.

(60) Provisional application No. 60/098,296, filed on Aug. 27, 1998, provisional application No. 60/061,809, filed on Oct. 14, 1997.

(51) Int. Cl.
   *G06F 13/00* (2006.01)
   *G06F 3/00* (2006.01)

(52) U.S. Cl. .................. 710/22; 710/308; 710/310; 710/39; 711/154; 709/200

(58) Field of Classification Search .................. 710/22, 710/305, 39, 310, 62, 308; 709/200, 239; 711/154

See application file for complete search history.

(56) References Cited

U.S. PATENT DOCUMENTS

4,366,538 A   12/1982   Johnson et al. .............. 364/200

(Continued)

FOREIGN PATENT DOCUMENTS

WO   PCT/US97/17257   5/1998

(Continued)

OTHER PUBLICATIONS

Mackenzie, et al. "An Intel IPX1200-Based Network Interface", http://www.cc.gatech.edu/~kenmac/asan/asan-san-2.pdf.*

(Continued)

*Primary Examiner*—Pierre-Michel Bataille
(74) *Attorney, Agent, or Firm*—Mark A. Lauer; T. Lester Wallace

(57) ABSTRACT

A network interface device couples a host computer to a network. The network interface device includes a processor and a DMA controller. The processor causes the DMA controller to perform multiple DMA commands before the processor takes a particular software branch. The processor issues the DMA commands by placing the DMA commands in a memory and then pushing values indicative of the DMA commands onto a DMA command queue. The values are popped off the DMA command queue and are executed by the DMA controller one at a time. The DMA commands are executed in the same order that they were issued by the processor. The processor need not monitor multiple DMA commands to make sure they have all been completed before the software branch is taken, but rather the processor pops a DMA command complete queue to make sure that the last of the DMA commands has been completed.

33 Claims, 3 Drawing Sheets

U.S. PATENT DOCUMENTS

| | | | | |
|---|---|---|---|---|
| 4,589,063 A | 5/1986 | Shah et al. ............... 710/8 |
| 4,991,133 A | 2/1991 | Davis et al. ............... 364/900 |
| 5,056,058 A | 10/1991 | Hirata et al. ............... 364/900 |
| 5,058,110 A | 10/1991 | Beach et al. ............... 370/85.6 |
| 5,097,442 A | 3/1992 | Ward et al. ............... 365/78 |
| 5,163,131 A | 11/1992 | Row et al. ............... 395/200 |
| 5,212,778 A | 5/1993 | Dally et al. ............... 395/400 |
| 5,280,477 A | 1/1994 | Trapp ............... 370/85.1 |
| 5,289,580 A | 2/1994 | Latif et al. ............... 395/275 |
| 5,303,344 A | 4/1994 | Yokoyama et al. ............... 395/200 |
| 5,412,782 A | 5/1995 | Hausman et al. ............... 395/250 |
| 5,418,912 A | 5/1995 | Christenson ............... 709/234 |
| 5,448,566 A | 9/1995 | Richter et al. ............... 370/94.1 |
| 5,485,579 A | 1/1996 | Hitz et al. ............... 395/200.12 |
| 5,506,966 A | 4/1996 | Ban ............... 395/250 |
| 5,511,169 A | 4/1996 | Suda ............... 395/280 |
| 5,517,668 A | 5/1996 | Szwerinski et al. ............... 395/800 |
| 5,524,250 A | 6/1996 | Chesson et al. ............... 395/775 |
| 5,535,375 A | 7/1996 | Eshel ............... 703/27 |
| 5,548,730 A | 8/1996 | Young et al. ............... 395/280 |
| 5,566,170 A | 10/1996 | Bakke et al. ............... 370/60 |
| 5,588,121 A | 12/1996 | Reddin et al. ............... 395/200.15 |
| 5,590,328 A | 12/1996 | Seno et al. ............... 395/675 |
| 5,592,622 A | 1/1997 | Isfeld et al. ............... 395/200.02 |
| 5,598,410 A | 1/1997 | Stone ............... 370/469 |
| 5,619,650 A | 4/1997 | Bach et al. ............... 395/200.01 |
| 5,629,933 A | 5/1997 | Delp et al. ............... 370/411 |
| 5,633,780 A * | 5/1997 | Cronin ............... 361/220 |
| 5,634,099 A | 5/1997 | Andrews et al. ............... 395/200.07 |
| 5,634,127 A | 5/1997 | Cloud et al. ............... 395/680 |
| 5,642,482 A | 6/1997 | Pardillos ............... 395/200.2 |
| 5,664,114 A | 9/1997 | Krech, Jr. et al. ............... 395/200.64 |
| 5,671,355 A | 9/1997 | Collins ............... 395/200.2 |
| 5,678,060 A | 10/1997 | Yokoyama et al. ............... 709/212 |
| 5,682,534 A | 10/1997 | Kapoor et al. ............... 709/203 |
| 5,692,130 A | 11/1997 | Shobu et al. ............... 395/200.12 |
| 5,699,317 A | 12/1997 | Sartore et al. ............... 395/230.06 |
| 5,701,434 A | 12/1997 | Nakagawa ............... 395/484 |
| 5,701,516 A | 12/1997 | Cheng et al. ............... 395/842 |
| 5,708,779 A * | 1/1998 | Graziano et al. ............... 709/250 |
| 5,727,142 A | 3/1998 | Chen ............... 395/181 |
| 5,742,765 A * | 4/1998 | Wong et al. ............... 709/250 |
| 5,749,095 A | 5/1998 | Hagersten ............... 711/141 |
| 5,751,715 A | 5/1998 | Chan et al. ............... 370/455 |
| 5,752,078 A | 5/1998 | Delp et al. ............... 395/827 |
| 5,758,084 A | 5/1998 | Silverstein et al. ............... 395/200.58 |
| 5,758,089 A | 5/1998 | Gentry et al. ............... 395/200.64 |
| 5,758,186 A | 5/1998 | Hamilton et al. ............... 395/831 |
| 5,758,194 A | 5/1998 | Kuzma ............... 395/886 |
| 5,771,349 A | 6/1998 | Picazo, Jr. et al. ............... 395/188.01 |
| 5,778,013 A | 7/1998 | Jedwab ............... 714/807 |
| 5,778,419 A | 7/1998 | Hansen et al. ............... 711/112 |
| 5,790,804 A | 8/1998 | Osborne ............... 395/200.75 |
| 5,794,061 A | 8/1998 | Hansen et al. ............... 395/800.01 |
| 5,802,258 A | 9/1998 | Chen ............... 395/182.08 |
| 5,802,580 A | 9/1998 | McAlpice ............... 711/149 |
| 5,809,328 A | 9/1998 | Nogales et al. ............... 395/825 |
| 5,812,775 A | 9/1998 | Van Seters et al. ............... 395/200.43 |
| 5,815,646 A | 9/1998 | Purcell et al. ............... 395/163 |
| 5,848,293 A | 12/1998 | Gentry ............... 710/5 |
| 5,872,919 A | 2/1999 | Wakeland ............... 709/230 |
| 5,878,225 A | 3/1999 | Bilansky et al. ............... 395/200.57 |
| 5,892,903 A | 4/1999 | Klaus ............... 709/227 |
| 5,898,713 A | 4/1999 | Melzer et al. ............... 371/53 |
| 5,913,028 A | 6/1999 | Wang et al. ............... 395/200.33 |
| 5,920,566 A | 7/1999 | Hendel et al. ............... 370/401 |
| 5,930,830 A | 7/1999 | Mendelson et al. ............... 711/171 |
| 5,931,918 A | 8/1999 | Row et al. ............... 709/300 |
| 5,935,205 A | 8/1999 | Murayama et al. ............... 709/216 |
| 5,937,169 A | 8/1999 | Connery et al. ............... 395/200.8 |
| 5,941,969 A | 8/1999 | Ram et al. ............... 710/128 |
| 5,941,972 A | 8/1999 | Hoese et al. ............... 710/129 |
| 5,950,203 A | 9/1999 | Stakuis et al. ............... 707/10 |
| 5,991,299 A | 11/1999 | Radogna et al. ............... 370/392 |
| 5,996,024 A | 11/1999 | Blumenau ............... 709/301 |
| 6,005,849 A | 12/1999 | Roach et al. ............... 370/276 |
| 6,009,478 A | 12/1999 | Panner et al. ............... 710/5 |
| 6,016,513 A | 1/2000 | Lowe ............... 709/250 |
| 6,021,446 A | 2/2000 | Gentry, Jr. ............... 709/303 |
| 6,021,507 A | 2/2000 | Chen ............... 714/2 |
| 6,026,452 A | 2/2000 | Pitts ............... 710/56 |
| 6,034,963 A | 3/2000 | Minami et al. ............... 370/401 |
| 6,038,562 A | 3/2000 | Anjur et al. ............... 707/10 |
| 6,041,058 A | 3/2000 | Flanders et al. ............... 370/401 |
| 6,044,438 A | 3/2000 | Olnowich ............... 711/130 |
| 6,047,323 A | 4/2000 | Krause ............... 709/227 |
| 6,047,356 A | 4/2000 | Anderson et al. ............... 711/129 |
| 6,049,528 A | 4/2000 | Hendel et al. ............... 370/235 |
| 6,057,863 A | 5/2000 | Olarig ............... 345/520 |
| 6,061,368 A | 5/2000 | Hitzelberger ............... 370/537 |
| 6,065,096 A | 5/2000 | Day et al. ............... 711/114 |
| 6,067,569 A | 5/2000 | Khaki et al. ............... 709/224 |
| 6,070,200 A | 5/2000 | Gates et al. ............... 710/20 |
| 6,078,733 A * | 6/2000 | Osborne ............... 709/250 |
| 6,097,734 A | 8/2000 | Gotesman et al. ............... 370/474 |
| 6,101,555 A | 8/2000 | Goshey et al. ............... 709/321 |
| 6,115,615 A | 9/2000 | Ota et al. ............... 455/422.1 |
| 6,122,670 A | 9/2000 | Bennett et al. ............... 709/236 |
| 6,141,705 A | 10/2000 | Anand et al. ............... 710/15 |
| 6,145,017 A | 11/2000 | Ghaffari ............... 710/5 |
| 6,157,955 A | 12/2000 | Narad et al. ............... 709/228 |
| 6,172,980 B1 | 1/2001 | Flanders et al. ............... 370/401 |
| 6,173,333 B1 | 1/2001 | Jolitz et al. |
| 6,202,105 B1 | 3/2001 | Gates et al. ............... 710/20 |
| 6,226,680 B1 | 5/2001 | Boucher et al. ............... 709/230 |
| 6,233,242 B1 | 5/2001 | Mayer et al. ............... 370/392 |
| 6,246,683 B1 | 6/2001 | Connery et al. ............... 370/392 |
| 6,247,060 B1 | 6/2001 | Boucher et al. ............... 709/238 |
| 6,279,051 B1 | 8/2001 | Gates et al. ............... 710/20 |
| 6,289,023 B1 | 9/2001 | Dowling et al. ............... 370/419 |
| 6,298,403 B1 | 10/2001 | Suri et al. ............... 710/100 |
| 6,334,153 B1 | 12/2001 | Boucher et al. ............... 709/230 |
| 6,345,301 B1 | 2/2002 | Burns et al. ............... 709/230 |
| 6,345,302 B1 | 2/2002 | Bennett et al. ............... 709/236 |
| 6,356,951 B1 | 3/2002 | Gentry, Jr. ............... 709/250 |
| 6,385,647 B1 | 5/2002 | Willis et al. ............... 709/217 |
| 6,389,468 B1 | 5/2002 | Muller et al. ............... 709/226 |
| 6,389,479 B1 | 5/2002 | Boucher ............... 709/243 |
| 6,393,487 B1 * | 5/2002 | Boucher et al. ............... 709/238 |
| 6,421,742 B1 | 7/2002 | Tillier ............... 710/1 |
| 6,427,169 B1 | 7/2002 | Elzur ............... 709/224 |
| 6,434,651 B1 | 8/2002 | Gentry, Jr. ............... 710/260 |
| 6,449,656 B1 | 9/2002 | Elzur et al. ............... 709/236 |
| 6,453,360 B1 | 9/2002 | Muller et al. ............... 709/250 |
| 6,480,489 B1 | 11/2002 | Muller et al. ............... 370/389 |
| 6,487,654 B1 | 11/2002 | Dowling |
| 6,490,631 B1 | 12/2002 | Teich et al. ............... 709/250 |
| 6,526,446 B1 | 2/2003 | Yang et al. ............... 709/230 |
| 6,591,310 B1 | 7/2003 | Johnson ............... 710/3 |
| 6,650,640 B1 | 11/2003 | Muller et al. ............... 370/392 |
| 6,681,364 B1 | 1/2004 | Calvignac et al. |
| 6,697,868 B1 | 2/2004 | Craft et al. ............... 709/230 |
| 6,807,581 B1 | 10/2004 | Starr et al. ............... 709/250 |
| 6,912,522 B1 | 6/2005 | Edgar |
| 6,941,386 B1 | 9/2005 | Craft et al. ............... 709/250 |
| 2001/0004354 A1 | 6/2001 | Jolitz |
| 2001/0013059 A1 | 8/2001 | Dawson et al. ............... 709/217 |
| 2001/0014892 A1 | 8/2001 | Gaither et al. ............... 707/200 |
| 2001/0025315 A1 | 9/2001 | Jolitz |
| 2001/0048681 A1 | 12/2001 | Bilic et al. ............... 370/389 |
| 2001/0053148 A1 | 12/2001 | Bilic et al. ............... 370/389 |

| | | |
|---|---|---|
| 2003/0066011 A1 | 4/2003 | Oren .......................... 714/758 |
| 2003/0165160 A1 | 9/2003 | Minami et al. ............. 370/466 |
| 2004/0054814 A1 | 3/2004 | McDaniel |
| 2004/0153578 A1 | 8/2004 | Elzur |

FOREIGN PATENT DOCUMENTS

| | | |
|---|---|---|
| WO | PCT/US98/08719 | 11/1998 |
| WO | PCT/US98/24943 | 11/1998 |
| WO | PCT/US98/14729 | 1/1999 |
| WO | WO 99/65219 | 12/1999 |
| WO | WO 01/04770 A2 | 1/2001 |
| WO | WO 01/05107 A1 | 1/2001 |
| WO | WO 01/05116 A2 | 1/2001 |
| WO | WO 01/05123 A1 | 1/2001 |
| WO | WO 01/40960 A1 | 6/2001 |
| WO | WO 01/59966 | 8/2001 |
| WO | WO 01/86430 | 11/2001 |

OTHER PUBLICATIONS

Willmann et al, "An Efficient Programmable 10 Gigabit Ethernet Network Interface", The International Symposium on High-Performance, http://www-ece.rice.edu/~willmann/pubs/willmannp_ethernet.pdf.*

Rockwell Fact Sheet (80 pages), ISDN/DMI Link Layer Controller VLSI Device, dated Jul. 23, 1986.*

Application Note DMA Mode Operation of the T711A Synchronous Packet Data Formatter, Copyright 1988 AT&T.*

Fryer, Ron; "Teradata Version 2: Critical Success Factors for Data Warehouses", NCR Mar. 11, 1996, pp. 1-21.*

"DMA Command Chaining to Support Bus Master Interleaved Memory and I/O Transfers on a Micro Channel" IBM TDB n1 Jun. 1991 pp. 236-237.*

Internet pages entitled: DART Fast Application—Level Networking Via Data-Copy Avoidance, by Robert J. Walsh, printed Jun. 3, 1999.

Internet pages of InterProphet entitled: Frequently Asked Questions, by Lynne Jolitz, printed Jun. 14, 1999.

Internet pages entitled: Technical White Paper—Xpoint's Disk-to-LAN Acceleration Solution for Windows NT Server, printed Jun. 5, 1997.

Jato Technologies Internet pages entitled: Network Accelerator Chip Architecture, twelve-slide presentation, printed Aug. 19, 1998.

EETIMES article entitled: Enterprise System Uses Flexible Spec, by Christopher Harrer and Pauline Schulman, dated Aug. 10, 1998, Issue 1020, printed Nov. 25, 1998.

Internet pages entitled: iReady About Us and iReady Products, printed Nov. 25, 1998.

Internet pages entitled: Smart Ethernet Network Interface Card, which Berend Ozceri is developing, printed Nov. 25, 1998.

Internet pages entitled : Hardware Assisted Protocol Processing, which Eugene Feinberg is working on, printed Nov. 25, 1998.

Internet pages of XaQti Corporation entitled: Giga POWER Protocol Processor Product Preview, printed Nov. 25, 1998.

Internet pages of Xpoint Tecnologies www.xpoint.com web site (5 pages), printed Dec. 19, 1997.

Internet pages relating to iReady Corporation and the iReady Internet Tuner Module, printed Nov. 2, 1998.

Internet pages entitled: Asante and 100BASE-T Fast Ethernet, printed May 27, 1997.

Internet pages entitled: A Guide to the Paragon XP/S-A7 Supercomputer at Indiana University, printed Dec. 21, 1998.

U.S. Provisional Appl. No. 60/053,240, by Jolitz et al. (listed filing date Jul. 18, 1997).

Zilog Product Brief entitled "Z85C30 CMOS SCC Serial Communication Controller", Zilog Inc., 3 pages (1997).

Andrew S. Tanenbaum, Computer Networks, Third Edition, ISBN 0-13-349945-6 (1996).

Richard Stevens, "TCP/IP Illustrated, vol. 1, The Protocols", pp. 325-326 (1994).

VT8501 Apollo MVP4 Documentation, VIA Technologies, Inc., pp. i-iv, 1-11, cover and copyright page, revision 1.3 (Feb. 1, 2000).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996.

Internet pages directed to; Technical Brief on Alteon Ethernet Gigabit NIC technology, www.alteon.com, 14 pages, printed Mar. 15, 1997.

U.S. Appl. No. 08/964,304, Napolitano et al.

Web pages entitled "iReady Rounding Out Management Team With Two Key Executives", 2 pages (printed Nov. 28, 1998).

Toshiba, "Toshiba Delivers First Chips To Make Consumer Devices Internet-Ready Based On iReady 's Design," Press Release Oct. 14, 1998, 3 pages.

Web pages, www.ireadyco.com, iReady, "Products," 2 pages. Printed Nov. 25, 1998.

Info Work, "Toshiba , iReady shipping internet chip," by Rob Gruth, 1 page , printed Nov. 28, 1998.

Internet site www.interprophet.com, 17 pages, printed Mar. 1, 2000.

The I-1000 Internet Tuner, iReady Corporation, 2 pages, date unknown.

Web pages from www.ireadyco.com, "Introduction," 3 pages, downloaded Nov. 25, 1998.

IReady New Archive, "Revolutionary Approach to Consumer Electronics Internet Connectivity Funded", San Jose, CA, 2 pages, Nov. 20, 1997.

IReady News Archive, Seiko Instrument s Inc. (SII) Introduces World's First Internet-Ready Intelligent LCD Modules Based on IReady Technology, by Endo, Brogan and Johnson, printed Nov. 2, 1998.

NEWSwatch—Iready Internet Tuner to Web Enable Devices, Nov. 5, 1996, 2 pages, printed Nov. 2, 1998.

David Lammers, EETimes, Jun. 13, 1997, Tuner for Toshiba, Toshiba Taps iReady For Internet Tuner, 3 pages, printed Nov. 2, 1998.

Internet pages entitled: "Comparison of Novell Netware and TCP/IP Protocol Architectures," by Janique Carbone, Jul. 16, 1995, 19 pages Apr. 10, 1998.

Internet web pages from "Adaptec.com" website directed to the Adaptec, AEA-7110C iSCSI Host Bus Adapter . . . 11 pages, downloaded Oct. 1, 2001.

iSCSI HBA article entitled "FCE-3210/6410 32 and 64-bit PCI-to-Fibre Channed HBA", 6 pages, printed Oct. 1, 2001.

Internet web pages from the "iSCSI Storage .com" website that mention an Emulex HBA, 2 pages downloaded Oct. 1, 2001.

Internet web pages from the "iSCSI HBA.com" website that mention QLogic HBAs including the "SANblade 2300 Series", 8 pages download Oct. 1, 2001.

"Two-Way TCP Traffic over Rate Controlled Channels: Effects and Analysis," by Lampros Kalampoukas, Anujan Varma and K.K. Ramakrishnan, IEEE Transactions on Networking, vol. 6, No. 6, 17 pages, Dec. 1998.

iReady News Archive, "Toshiba Delivers First Chips to Make Consumer Devices Internet-Ready Based on iReady Design," 3 pages, downloaded Nov. 2, 1998.

"File System Design for an NFS File Server Appliance," by Dave Hitz, et al., 13 pages, copyright 1996.

Adaptec press release, "Adaptec Announces EtherStorage Technology", 2 pages May 4, 2000, printed Jun. 14, 2000.

Adaptec article entitled, "EtherStorage Frequently Asked Questions," 5 pages, downloaded Jul. 19, 2000.

Adaptec article entitled, "EtherStorage White Paper," 7 pages, downloaded Jul. 19, 2000.

Article entitled, "Computers; Storage," by James Berlino and Ananda Baruah, CIBC World Markets Equity Research, 9 pages, Aug. 7, 2000.

Merrill Lynch article entitled, "Storage Futures," by Steven Milunovich, 22 pages, May 10, 2000.

CBS Market Watch article entitled "Montreal start-up battles data storage bottleneck," by Susan Taylor, 2 pages, dated Mar. 5, 2000, 2 pages printed Mar. 7, 2000.

Internet-Draft article entitled "SCSI/TCP (SCSI over TCP)," by Satran et al., 38 pages, dated Feb. 2000. printed May 19, 2000.

Form 10-K for Exelan, Inc., for the fiscal year ending Dec. 31, 1987 (10 Pages).

Form 10-K for Exelan, Inc., for the fiscal year Dec. 31, 1988 (10 pages).

"Second Supplemental Information Disclosure Statement per 37 C.F.R. §1.97(i)", dated Jul. 29, 2002 relating to Exelan Inc. as submitted in U.S. Appl. No. 09/464,283.

WindRiver article entitled "Tornado: For Intelligent Network Acceleration", copyright 2001, 2 pages.

WindRiver White Paper entitled "Complete TCP/IP Offload for High-Speed Ethernet Networks", Copyright 2002, 7 pages.

Intel article entitled "Solving Server Bottlenecks with Intel Server Adapters", Intel Corporation, Copyright 1999, 8 pages.

Article from Rice University entitled "LRP: A New Network Subsystem Architecture for Server Systems", by Peter Druschel and Gaurav Banga, Rice University, Oct. 1996, 8 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Internet pages of Xpoint Technologies, Inc. entitled "Smart LAN Work Requests", 5 pages, printed Dec. 19, 1997.

Thia, Y.H. Publication entitled "High-Speed OSI Protocol Bypass Algorithm with Window Flow Control", *Protocols for High Speed Networks*, pp. 53-68, 1993.

Thia, Y.H. Publication entitled "A Reduced Operational Protocol Engine (ROPE) for a multiple-layer bypass architecture", *Protocols for High Speed Networks*, pp. 224-239, 1995.

\* cited by examiner

NETWORK INTERFACE DEVICE EMPLOYING A DMA COMMAND QUEUE

CROSS-REFERENCE TO RELATED APPLICATIONS

This application is a continuation of and claims the benefit under 35 U.S.C. §120 of U.S. patent application Ser. No. 09/464,283, filed Dec. 15, 1999, by Laurence B. Boucher et al., now U.S. Pat. No. 6,427,173, which in turn is a continuation of and claims the benefit under 35 U.S.C. §120 of U.S. patent application Ser. No. 09/439,603, filed Nov. 12, 1999, by Laurence B. Boucher et al., now U.S. Pat. No. 6,247,060, which in turn claims the benefit under 35 U.S.C. § 119(e)(1) of the Provisional Application Ser. No. 60/061,809, filed on Oct. 14, 1997. This application also is a continuation of and claims the benefit under 35 U.S.C. §120 of U.S. patent application Ser. No. 09/384,792, filed Aug. 27, 1999, now U.S. Pat. No. 6,434,620, which in turn claims the benefit under 35 U.S.C. § 119(e)(1) of the Provisional Application Ser. No. 60/098,296, filed Aug. 27, 1998.

This application also is a continuation of and claims the benefit under 35 U.S.C. §120 of U.S. patent application Ser. No. 09/067,544, filed Apr. 27, 1998, now U.S. Pat. No. 6,226,680. This application also is a continuation of and claims the benefit under 35 U.S.C. §120 of U.S. patent application Ser. No. 09/416,925, filed Oct. 13, 1999, now U.S. Pat. No. 6,470,415. The subject matter of all the above-identified patent applications, and of the two above-identified provisional applications, is incorporated by reference herein.

BACKGROUND INFORMATION

FIG. 1 (Prior Art) is a diagram of a network interface device (NID) 100 that couples a host computer 101 to a network 102. The particular NID 100 of FIG. 1 is an expansion card that is coupled to host computer 101 via PCI bus 103. NID 100 includes an integrated circuit 104, physical layer interface circuitry 105, and dynamic random access memory (DRAM) 106. Integrated circuit 104 includes a media access controller 107, queue manager hardware 108, a processor 109, sequencers 110, an SRAM controller 111, static random access memory (SRAM) 112, a DRAM controller 113, a PCI bus interface 114, a DMA controller 115, a DMA command register 116, and a DMA command complete register 117. For additional detail on one such integrated circuit 104, see U.S. patent application Ser. No. 09/464,283, filed Dec. 15, 1999 (the subject matter of which is incorporated herein by reference).

In one example, NID 100 is used to retrieve three portions of data 118–120 from host storage 121 and to output them to network 102 in the form of a data payload of a packet. In the situation where the three portions 118–120 are stored on different pages in host storage 121, it may be necessary to move the data to DRAM 106 individually. The three portions 118–120 are to all be present in DRAM 106 before packet transmission begins.

In the device of FIG. 1, processor 109 causes DMA controller 115 to execute DMA commands 122 by placing the DMA commands into SRAM 112 via lines 123 and SRAM controller 111. Once a DMA command is present in SRAM 112, processor 109 instructs the DMA controller to fetch and execute the DMA command by setting a bit in DMA command register 116. A DMA command includes a source address for data to be moved, a destination address for data to be moved, and a byte count. In the example of FIG. 1, there can be thirty-two pending DMA commands 122 stored in SRAM 112. Consequently, there are thirty-two bits in DMA register 116. DMA controller 115 fetches the command, executes the command, and then sets a corresponding bit in 32-bit DMA command complete register 117. Processor 109 monitors the bit in the DMA command complete register 117 to determine when the DMA command has been completed.

In the example of FIG. 1, each of the three data portions 118–120 is moved into DRAM 106 in two moves. In a first move, the data is moved from host storage 121 and to a buffer in SRAM 112. In a second move, the data is moved from the buffer in SRAM 112 and to DRAM 106.

To move the first portion of data 118 from host storage 121 to DRAM 106, processor 109 writes a DMA command into SRAM 112. DMA controller 115 retrieves the DMA command from SRAM 112 via SRAM controller 111 and lines 124. DMA controller 115 then executes the command by sending a request to PCI bus interface 114 via lines 125. PCI bus interface 114 responds by retrieving data 118 from a particular address X1 and supplying that data to SRAM controller 111 via lines 126. PCI bus interface 114 reports completion of this action by returning an acknowledge signal to DMA controller 115 via line 127. SRAM controller 111 writes the data into the buffer in SRAM 112. DMA controller 115 then issues a request to DRAM controller 113 via lines 128. Data from SRAM 112 is then transferred via SRAM controller 111, lines 129, and DRAM controller 113 to a location 130 (address Z1) in DRAM 106. When this action is complete, DRAM controller 113 returns an acknowledge signal to DMA controller 115 via line 131. DMA controller 115 sets a bit corresponding to this completed DMA command in the DMA command complete register 117. In this way, each of the three portions of data 118–120 is moved through SRAM 112 and into DRAM 106. Although the three data portions are illustrated being stored in DRAM 106 at different locations Z1, Z2 and Z3, this need not be the case. All three data portions are sometimes stored in one continuous block.

In the particular NID 100 of FIG. 1, DMA controller 115 may execute DMA commands in an order different from the order in which the DMA commands were placed in SRAM 112 by processor 109. For example, while DMA controller 115 is moving the first portion 118 to DRAM 106, the processor 109 may place additional DMA commands into SRAM 112. When DMA controller 115 finishes moving first portion 118, the DMA controller 115 may fetch a DMA command to move the third portion 120 next. Because all three data portions 118–120 are to be in DRAM 106 before transmission of the packet begins, processor 109 cannot only check that the last move in the sequence is completed. Rather, processor 109 must check to make sure that all the moves are completed before processor 109 goes on in its software to execute the instructions that cause the ultimate packet to be formed and output from NID 100.

SUMMARY

It may be undesirable for processor 109 on network interface device 100 to have to monitor a set of multiple DMA commands to make sure that all of the DMA commands in the set have been executed. Monitoring a set of multiple DMA commands can be complex. Monitoring multiple such DMA commands can involve multiple processor instructions and consequently can slow processor execution.

In accordance with one embodiment of the present invention, a DMA command queue is maintained on a network interface device. A processor on the network interface device pushes values onto the DMA command queue. Although a value pushed onto the queue can be a DMA command itself in some embodiments, each value pushed preferably includes an address that identifies a location where a particular DMA command is stored. The DMA command queue is popped such that a DMA controller on the network interface device executes DMA commands in the order in which the processor pushed the associated values onto the DMA command queue. Complications associated with DMA commands being issued by the processor in one order but being completed by the DMA controller in another order are thereby alleviated or avoided.

In one embodiment, a DMA command complete queue is also maintained by dedicated queue manager hardware on the network interface device. Upon completing a DMA command, the DMA controller pushes a value onto the DMA command complete queue. The value identifies the DMA command completed. The processor determines which DMA commands have been completed by popping the DMA command complete queue. In a situation where a set of multiple DMA commands must be executed before software executing on the processor takes a particular software branch, the processor does not monitor each of the multiple DMA commands to make sure that all of the commands have been completed. Rather, the processor monitors the values popped off the DMA command complete queue. When the value popped off the DMA command complete queue is the value indicative of the last DMA command of the multiple DMA commands, then the processor takes the particular branch. In one embodiment, the multiple DMA commands are commands to move portions of data from different pages in host storage onto the network interface device, where those portions of data are to be put together on the network interface device to form a data payload of a network packet. All the portions of data are moved onto the network interface device before the processor takes the software branch that causes the packet to be formed and output from the network interface device.

In some embodiments, the network interface device maintains multiple DMA command queues. Some of the DMA command queues are for moving data from one location on the network interface device to another location on the network interface device. For example, multiple frames of a session layer message are, in one embodiment, received onto the network interface device and stored in DRAM. A first part of each of the frames is then moved from DRAM to SRAM (from a first location on the network interface device to a second location on the network interface device, the first location being the DRAM and second location being the SRAM), where each DMA move is carried out by a DMA controller on the network interface device executing an associated DMA command from a DMA command queue. The DMA command queue is maintained by hardware queue manager circuitry on the network interface device. Alternatively, the DMA command queue is a software queue maintained on the network interface device. The first parts of the frames are moved into SRAM so that a processor on the network interface device can then examine the headers of the frames and determine from those headers what to do with the associated frames. In some embodiments, there is a separate DMA controller for each DMA command queue.

Other embodiments are described. This summary does not purport to define the invention. The claims, and not this summary, define the invention.

DETAILED DESCRIPTION OF THE PREFERRED EMBODIMENTS

Figure 2:
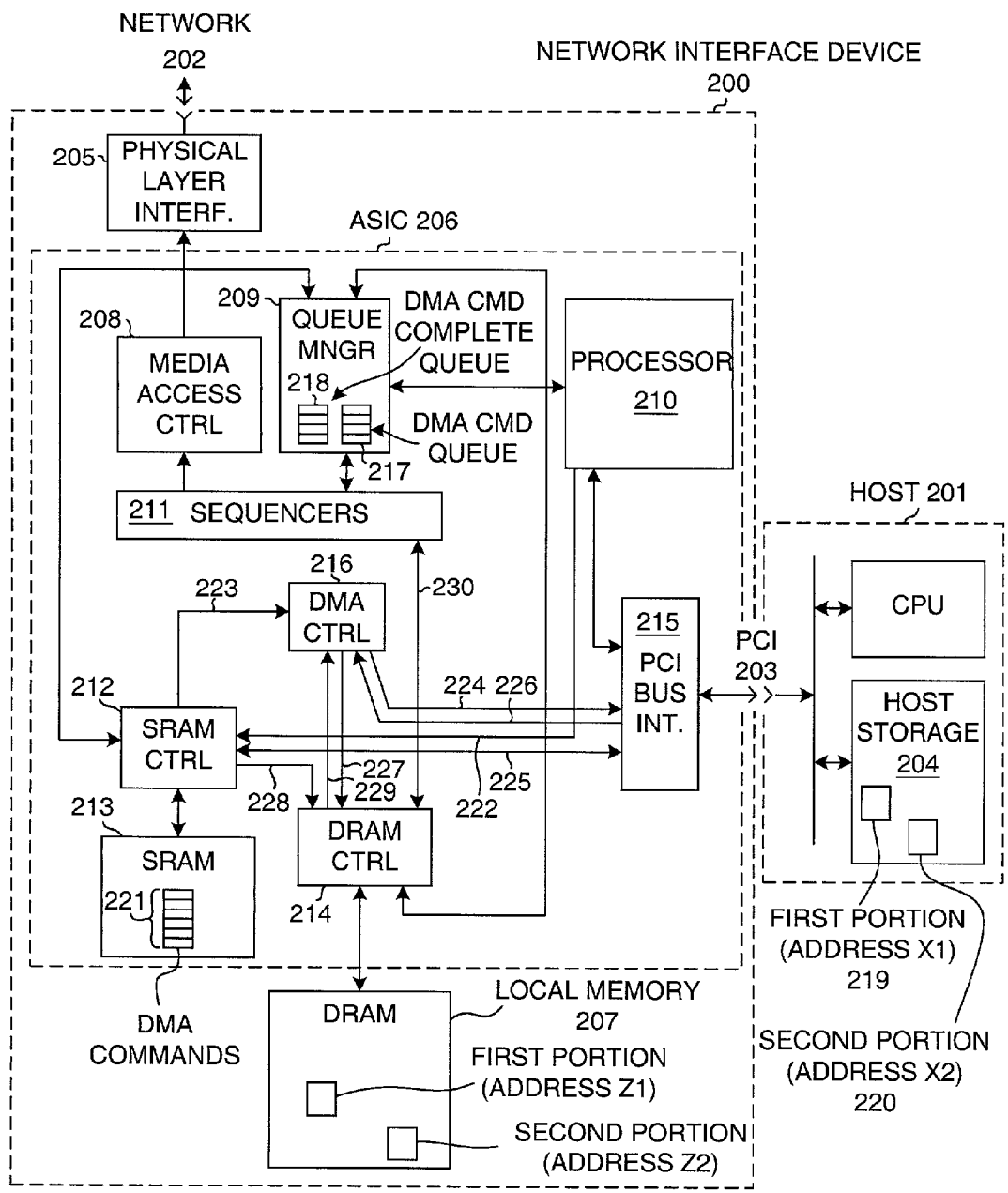
FIG. 2 is a diagram of a network interface device (NID) in accordance with one embodiment of the present invention.

FIG. 2 is a diagram of a network interface device 200 in accordance with one embodiment of the present invention. Network interface device 200, in this example, is an intelligent network interface card (INIC) that is used to couple host computer 201 to a network 202. The network interface device (NID) 200 is coupled to host computer 201 via bus 203. Bus 203 in this example is a PCI bus.

Although not illustrated in FIG. 2, bus 203 itself may not extend all the way to host storage 204. Rather, an intermediate integrated circuit (for example, a memory controller integrated circuit, or an I/O integrated circuit, or a bridge integrated circuit such as the Intel 82801) may be disposed between the bus 203 and host storage 204. In such a case, host storage 204 may be coupled to the intermediate integrated circuit via the local bus of the host computer 201.

The particular network interface device 200 of FIG. 2 includes physical layer interface circuitry 205, an integrated circuit 206, and local memory 207. In this example, local memory 207 is dynamic random access memory (DRAM). Integrated circuit 206 includes media access control circuitry 208, queue manager hardware 209, a processor 210, a sequencers block 211, an SRAM controller 212, static random access memory 213, a DRAM controller 214, a PCI bus interface 215, and a DMA controller 216. The diagram of FIG. 2 is a simplified diagram in order to facilitate explanation of an operation of network interface device 200. The network interface device 200 contains other circuit blocks and other interconnections.

Network interface device 200 performs transport and network layer protocol processing on certain network traffic using hardware specially-designed to speed such protocol processing (fast-path processing), thereby accelerating the processing of this traffic and thereby off-loading the main protocol processing stack (slow-path processing) on the host computer. For additional details on the structure and operation of one particular embodiment of the network interface device 200, see U.S. patent application Ser. No. 09/464,283, filed Dec. 15, 1999 (the subject matter of which is incorporated herein by reference). For additional details on the structure and operation of one embodiment of queue manager hardware 209, see U.S. patent application Ser. No. 09/416,925, filed Oct. 13, 1999 (the subject matter of which is incorporated herein by reference).

Queue manager hardware 209 maintains a DMA command queue 217 and a DMA command complete queue 218. Although the DMA command queue 217 and the DMA command complete queue 218 are illustrated in FIG. 2 as being disposed within queue manager 209, the two queues 217 and 218 are in this embodiment actually stored in SRAM 213 and DRAM 207. The head and tail of each queue are stored in SRAM 213, whereas the body of each queue is stored in DRAM 207. Storing the heads and tails in fast SRAM rather than relatively slow DRAM speeds pushing and popping of the queues. It is to be understood, however, that the queues 217 and 218 maintained by queue manager hardware 209 can be stored in any of numerous possible places, including but not limited to the queue manager 209, SRAM 213, and DRAM 207.

Processor 210 can cause values to be pushed onto the DMA command queue 217 and can cause values to be popped off the DMA command complete queue 218. DMA controller 216 can cause values to be popped off the DMA command queue 217 and can cause values to be pushed onto the DMA command complete queue 218.

In one example, processor 210 proceeds down a software thread whereby a first portion of data 219 (at address X1) and a second portion of data 220 (at address X2) respectively in host storage 204 are to be moved into local memory 207 to locations Z1 and Z2, respectively. Only after both of the data portions 219–220 are present in local memory 207 does the software executed by processor 210 branch into the instructions that cause the two data portions to be output from the network interface device 200. After the branch, the two data portions 219 and 220 are output in the form of a data payload (or a portion of a data payload) of a network communication such as a TCP/IP packet. The network communication is output via media access control circuitry 208 and physical layer interface circuitry 205.

In the illustrated embodiment, there can be up to thirty-two pending DMA commands 221 stored in SRAM 213. Although the DMA commands 221 are illustrated in FIG. 2 as being located in one contiguous block, the various DMA commands 221 may be located in various different parts of SRAM 213. Each DMA command in this example includes 128 bits. The 128 bits include a source address (where to get data to be moved), a destination address (where to place the data), and a byte count (number of bytes of data to be moved).

Figure 3:
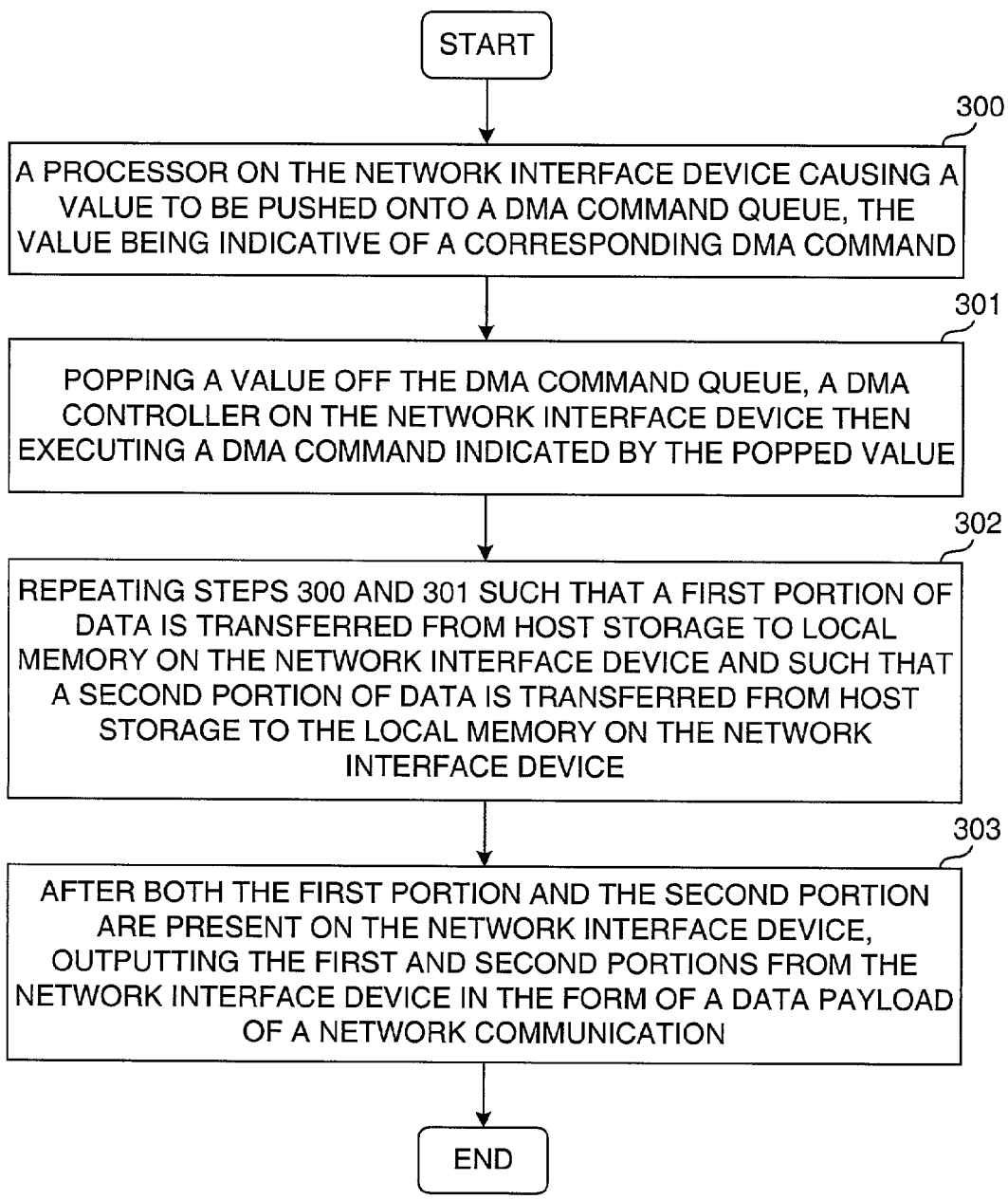
FIG. 3 is a flowchart of a method in accordance with one embodiment of the present invention.

FIG. 3 is a flow chart that illustrates a method in accordance with an embodiment of the invention. Processor 210, as it proceeds down the thread, places a set of multiple (in this case two) DMA commands into SRAM 213. The first DMA command is to move first portion of data 219 from address X1 in host storage 204 to address Z1 in local memory 207. After placing the first DMA command into SRAM 213 via lines 222 and SRAM controller 212, processor 210 causes a value that points to the first DMA command in SRAM 213 to be pushed (step 300) onto DMA command queue 217. Processor 210 does this by first writing a queue identifier into a queue control register (not shown) in queue manager 209. This queue identifier indicates the queue onto which a subsequently written 32-bit queue data value is to be pushed. Processor 210 then writes a 32-bit queue data value onto a queue data register (not shown) in queue manager 209. The 32-bit queue data value contains: a 16-bit address where the DMA command is located in SRAM 213, a 5-bit termination queue identifier, an 8-bit termination value to be pushed onto the queue identified by the termination queue identifier upon completion of the DMA command, a one-bit DMA chain bit value, a one-bit dummy DMA value, and one unused bit. If the DMA chain bit is set, this indicates that when the DMA controller has completed the DMA command, that the DMA controller is not to push a termination value onto any queue. If the dummy DMA bit is set, this indicates that the DMA controller is not to perform a DMA command per se but is nevertheless to push the 8-bit termination value onto the queue identified by the 5-bit termination queue identifier.

By placing DMA commands into SRAM 213, writing to the queue control register and then writing to the queue data register, processor 209 pushes two values onto DMA command queue 217. The first value is indicative of a first DMA command to move the first portion of data 219 from host storage 204 to local memory 207. The second value is indicative of a second DMA command to move the second portion of data 220 from host storage 204 to local memory 207.

DMA controller 216 causes a value to be popped off (step 301) the DMA command queue 217. In the present example, this first value points to the location in SRAM 213 where the first DMA command is stored. DMA controller 216 retrieves the first DMA command via SRAM controller 212 and lines 223 and executes the first DMA command. DMA controller 216 issues a request to PCI bus interface 215 via lines 224. PCI bus interface 215 in turn retrieves the first portion of data 219, supplies that first portion of data to SRAM controller 212 via lines 225, and returns an acknowledge signal to DMA controller 216 via line 226. SRAM controller 212 in turn writes the first portion of data 219 into SRAM 213. DMA controller 216 then issues a request to DRAM controller 214 via lines 227 to place the first portion of data into DRAM 207. The first portion of data passes from SRAM 213 via SRAM controller 212, lines 228, and DRAM controller 214 to DRAM 207. When the move is complete, DRAM controller 214 returns an acknowledge signal to DMA controller 216 via line 229. When the first data is present in local memory 207 at address Z1, the first DMA command is complete. DMA controller 216 pushes the termination value for the first DMA command onto the DMA command complete queue 218 (DMA command complete queue 218 is the queue identified by the termination queue identifier associated with the first DMA command).

The pushing of values onto the DMA command queue, the popping the values off the DMA command queue, and the executing of DMA commands indicated by the popped values is repeated (step 302) in such an order and fashion that the first and second portions of data are transferred to local memory. In the presently described example, two values are pushed onto the DMA command queue, then the first value is popped from the DMA command queue, and then the second value is popped from the DMA command queue. This need not be the case, however. The first value may be pushed onto the DMA command queue, then the first value may be popped from the DMA queue, then the second value may be pushed onto the DMA command queue, then the second value may be popped from the DMA command queue. Both orders of pushing and popping are encompassed by the flowchart of FIG. 3. Step 300 can be carried out twice before step 301 is carried out. Alternatively, step 300 can be carried out once, then step 301 can be carried out once, then step 300 can be carried out a second time, and then step 301 can be carried out a second time.

In the presently described example, DMA controller 216 retrieves the second DMA command and executes the second DMA command such that the second portion of data 220 is moved into local memory 207 via SRAM 213. When the second portion of data is present in local memory 207, DMA controller 216 pushes the termination value for the second DMA command onto the DMA command complete queue 218 (DMA command complete queue 218 is the queue identified by the termination queue identifier associated with the first DMA command).

Figure 1:
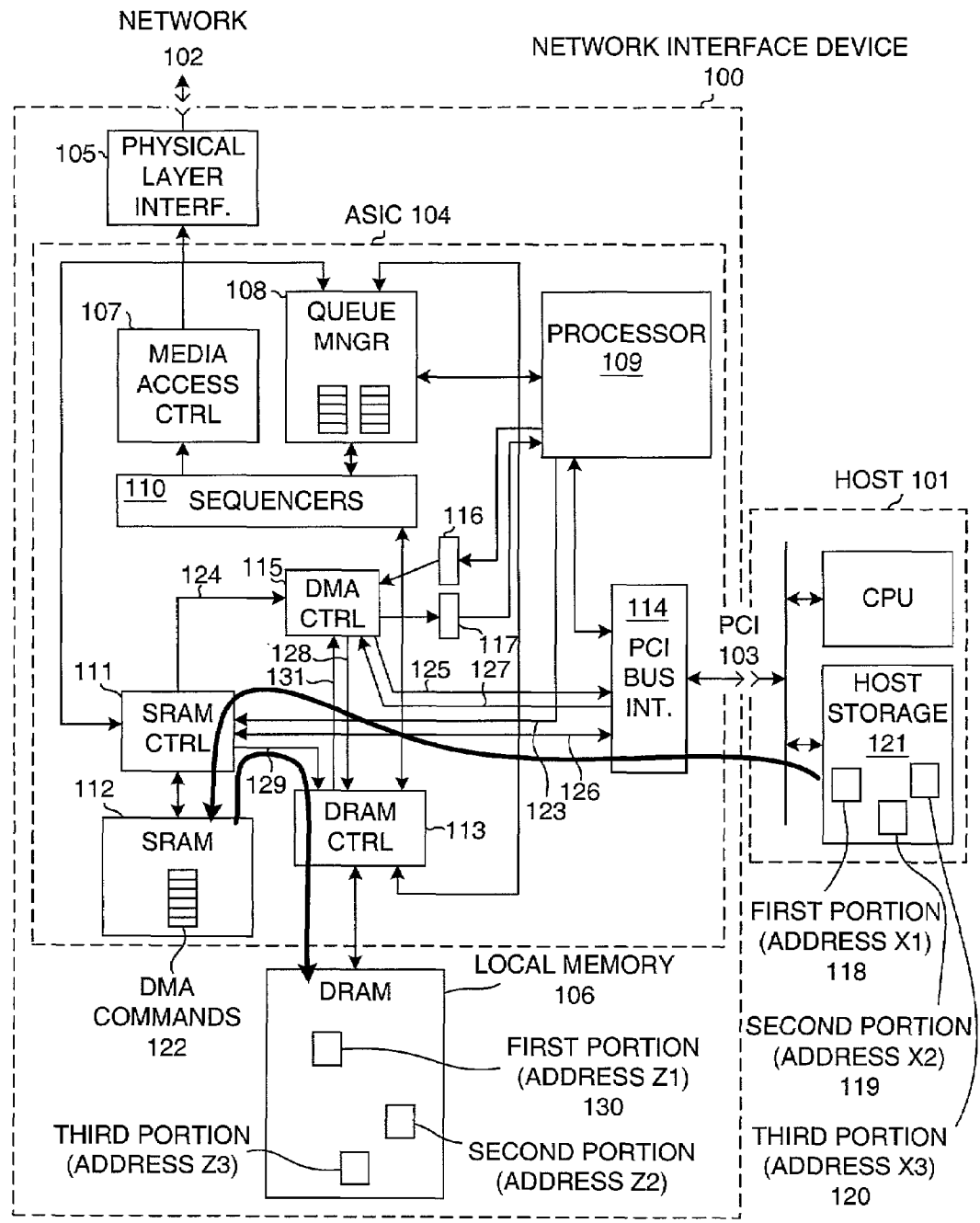
FIG. 1 (Prior Art) is a simplified diagram of one particular prior art network interface device.

Only after both portions of data 219 and 220 are present on the network interface device 200, does processor 210 branch to the instructions that cause the data of portions 219 and 220 to be output from the network interface device in the form of a data payload of a network communcation. To ensure that all of the necessary data portions have been moved to the network interface device 200, processor 210 need not monitor the complete status of all the DMA commands involved as in the prior art example of FIG. 1. Rather, processor 210 polls a 32-bit queue-out-ready register (not shown) in queue manager 209. Each bit in the queue-out-ready register indicates whether there is a value present in a corresponding queue. Processor 210 therefore polls the queue-out-ready register, determines that the bit for the DMA command complete queue is set, and then pops the DMA command complete queue 218. Processor 210 repeats this process until the value popped off the DMA command complete queue 218 is the value indicative of the last DMA command in the set of DMA commands. When the value popped off the DMA command complete queue is the value indicative of the last DMA command in the set of DMA commands, then it is known that all the proceeding DMA commands in the set have been executed.

In the presently described example, processor 210 monitors the values popped from DMA command complete queue 218 and when the value popped is the termination value for the second DMA command, then processor 210 (step 303) executes instructions that cause the first and second data portions 219 and 220 to be output from the network interface device 200. The data from local memory 207 passes via lines 230 to a transmit sequencer in sequencers block 211, and then through media access control circuitry 208 and physcial layer interface circuitry 205 to the network 202.

Where a set of multiple DMA commands are to be executed before processor 210 takes a software branch, processor 210 can be pushing values onto the DMA command queue 217 at the same time that DMA controller 216 is executing DMA commands. Although the movement of data from host storage 204 to local memory 207 involves temporary storage in SRAM 213 in this example, there need not be any such temporary storage. For example, in some embodiments data is transferred directly from host storage 204 to local memory 207. Data being transferred is buffered in SRAM 213 in the embodiment of FIG. 2 because local memory 207 is DRAM that may not be immediately available to store data when the data is transferred onto the network interface device. Rather than having to wait for the DRAM to become available before writing the data onto the network interface device, the data is written into SRAM 213. The data is later moved to DRAM when the DRAM is available.

Although the functionality of the network interface device 200 is described here as being carried out on an expansion card, it is to be understood that in some embodiments the network interface device is part of the host computer itself. In some embodiments, the network interface device is realized on a motherboard of the host computer. In some embodiments, the network interface device is integrated into a memory controller integrated circuit of the host computer such that data from host storage 204 is transferred to the network interface device without passing over a PCI bus or to an expansion card. For example, the network interface device may be integrated into the Intel 82815 Graphics and Memory Controller Hub, the Intel 440BX chipset, or the Apollo VT8501 MVP4 North Bridge chip. In some embodiments, the network interface device is part of an I/O integrated circuit chip such as, for example, the Intel 82801 integrated circuit of the Intel 820 chip set. In some embodiments where the network interface device functionality is embodied in an I/O integrated circuit chip, data from host storage 204 is transferred to the network interface device without passing over a PCI bus or to an expansion card. Rather the data passes through the host computer local bus, onto the I/O integrated circuit chip, and from the I/O integrated circuit chip's network interface port substantially directly to network 202 (through a physical layer interface device (PHY)) without passing over any expansion card bus.

Although the present invention has been described in connection with certain specific embodiments for instructional purposes, the present invention is not limited thereto. The use of a DMA command queue on a network interface device to alleviate or solve problems associated with DMA commands being completed out of order (in an order other than the order in which the processor issued the DMA commands) is not limited to the transfer of data from host storage 204 to network interface device 200. A DMA command queue is employed in some embodiments to move data from one location on network interface device 200 to another location on network interface device 200. Queue manager hardware 209 may maintain multiple DMA command queues at the same time. A separate DMA controller may be provided on the network interface device 200 for each such DMA command queue. Accordingly, various modifications, adaptations, and combinations of various features of the described embodiments can be practiced without departing from the scope of the invention as set forth in the claims.

What is claimed is:

1. An apparatus, comprising:
   means for maintaining a DMA command queue and a DMA command complete queue on a network interface device and for causing values to be pushed onto the DMA command queue and for causing values to be popped from the DMA command complete queue, each of the values pushed onto the DMA command queue being indicative of one of a plurality of DMA commands; and
   a DMA controller that executes the plurality of DMA commands such that the DMA commands are completed in a particular order, the DMA controller pushing values onto the DMA command complete queue, each of the values pushed onto the DMA command complete queue indicating completion of one of the plurality of DMA commands.

2. The apparatus of claim 1, wherein the means comprises a processor.

3. The apparatus of claim 1, wherein the means further comprises a hardware queue manager.

4. A network interface device, comprising:
   queue manager hardware that maintains a DMA command queue and a DMA command complete queue;
   a processor coupled to the queue manager hardware, the processor causing values to be pushed onto the DMA command queue, the processor causing values to be popped from the DMA command complete queue;
   a DMA controller coupled to the queue manager hardware, the DMA controller executing DMA commands, the DMA commands executed being indicated by values popped off the DMA command queue, the DMA controller pushing values onto the DMA command complete queue;
   local memory that temporarily stores a first portion of data transferred by execution of one or more DMA commands from data storage on a host coupled to the network interface device into the local memory, the local memory also temporarily storing a second portion of data transferred by execution of one or more DMA commands from the data storage on the host to the local memory; and physical layer interface and media access control circuitry, the physical layer interface and media access control circuitry outputting the first and second portions of data from the network interface device to a network, the first and second portions of data being output in the form of a data payload of a network communication.

5. The network interface device of claim 4, wherein the local memory is dynamic random access memory (DRAM).

6. The network interface device of claim 5, wherein the queue manager hardware stores at least part of the DMA command queue and the DMA command complete queue in static random access memory (SRAM).

7. A method, comprising:
(a) pushing values onto a DMA command queue in an order, each of the values being indicative of a different one of a plurality of DMA commands, wherein the DMA command queue is maintained on a network interface device (NID), and wherein the NID performs fast-path transport and network layer protocol processing;
(b) popping the DMA command queue such that a DMA controller on the NID executes the plurality of DMA commands in the order in which the associated values were pushed onto the DMA command queue, the DMA controller being a part of the NID;
(c) the DMA controller pushing values onto a DMA command complete queue, each of the values pushed onto the DMA command complete queue indicating completion of one of the plurality of DMA commands; and
(d) popping the DMA command complete queue.

8. The method of claim 7, wherein the NID includes a first memory and a second memory, the method further comprising:
(e) receiving multiple frames of a session layer network message onto the NID and storing the frames in the first memory, wherein execution of one of the plurality of DMA commands in (b) results in a move of at least a part of one of the frames from the first memory to the second memory, and wherein execution of another of the plurality of DMA commands in (b) results in a move of at least a part of another of the frames from the first memory to the second memory.

9. The method of claim 7, wherein the NID is integrated into an integrated circuit taken from the group consisting of: a memory controller integrated circuit, a graphics controller integrated circuit, an input/output integrated circuit, and a bridge integrated circuit, and wherein the integrated circuit of which the NID is a part is realized on a motherboard of a host computer.

10. The method of claim 8, wherein the DMA command complete queue is used to determine that the at least a part of one of the frames and the at least a part of another of the frames are both present in the second memory.

11. A method, comprising:
(a) using a DMA command queue to ensure that a plurality of DMA moves are completed in a particular sequence, each of the DMA moves being a move of information from one location on a network interface device to another location on the network interface device, the DMA command queue being maintained by queue manager hardware on the network interface device, the DMA moves being carried out by a DMA controller, the DMA controller being a part of the network interface device; and
(b) outputting at least part of the information from the network interface device, wherein a first of the plurality of DMA moves is a move of at least a part of a frame of a session layer message, and wherein a second of the plurality of DMA moves is a move of at least a part of a subsequent frame of the session layer message, wherein a processor pushes values onto the DMA command queue, each of the values being indicative of a different DMA command, and wherein the processor analyzes at least a part of the information moved in the first move, the processor doing the analyzing after the first move is complete.

12. The method of claim 11, wherein said one location on the network interface device is a dynamic random access memory (DRAM) and wherein said another location on the network interface device is a static random access memory (SRAM), wherein the first move is a move of information from a first buffer in the DRAM to a first buffer in the SRAM, and wherein the second move is a move of information from a second buffer in the DRAM to a second buffer in the SRAM.

13. The method of claim 11, wherein the processor does the analyzing before the second move is complete.

14. A method, comprising:
(a) using a DMA command queue to ensure that a plurality of DMA moves are completed in a particular sequence, each of the DMA moves being a move of information from one location on a network interface device to another location on the network interface device, the DMA command queue being maintained by queue manager hardware on the network interface device, the DMA moves being carried out by a DMA controller, the DMA controller being a part of the network interface device;
(b) the DMA controller pushing values onto a DMA command complete queue, each value indicating that one of the DMA moves has been carried out by the DMA controller;
(c) a processor on the network interface device popping values off the DMA command complete queue; and
(d) outputting at least part of the information from the network interface device.

15. The method of claim 14, wherein the information output in (b) is output from the network interface device to a host computer, the host computer being coupled to the network interace device.

16. The method of claim 14, wherein the information output in (b) is output from the network interface device to a network.

17. The method of claim 14, wherein a first of the plurality of DMA moves is a move of at least a part of a frame of a session layer message, and wherein a second of the plurality of DMA moves is a move of at least a part of a subsequent frame of the session layer message.

18. A method, comprising:
(a) maintaining on a network interface device a DMA command queue;
(b) a processor on the network interface device causing a value to be pushed onto the DMA command queue, the value being indicative of corresponding DMA command;
(c) popping a value off the DMA command queue, a DMA controller on the network interface device then executing a DMA command indicated by the popped value;
(d) repeating (b) and (c) such that a first portion of data is transferred from host storage to a local memory on the network interface device and such that a second portion of data is transferred from the host storage to the local memory on the network interface device; and (e) after both the first portion and the second portion are present in the local memory, outputting the first and second portions of data from the network interface device to a network, the first and second portions making up at least a part of a data payload of a network communication, wherein the pushing of (b) occurs twice before the popping of (c) occurs once.

19. A method, comprising:

(a) maintaining on a network interface device a DMA command queue;

(b) a processor on the network interface device causing a value to be pushed onto the DMA command queue, the value being indicative of corresponding DMA command;

(c) popping a value off the DMA command queue, a DMA controller on the network interface device then executing a DMA command indicated by the popped value;

(d) repeating (b) and (c) such that a first portion of data is transferred from host storage to a local memory on the network interface device and such that a second portion of data is transferred from the host storage to the local memory on the network interface device;

(e) maintaining a DMA command complete queue on the network interface device, the DMA controller pushing values onto the DMA command complete queue, the processor popping values off the DMA command complete queue; and (f) after both the first portion and the second portion are present in the local memory, outputting the first and second portions of data from the network interface device to a network, the first and second portions making up at least a part of a data payload of a network communication.

20. The method of claim 19, wherein the processor uses the DMA command complete queue to determine that the first and the second portions of data are both present in local memory on the network interface device.

21. The method of claim 19, wherein the network interface device comprises queue manager hardware, the queue manager hardware maintaining the DMA command queue and the DMA command complete queue in static random access memory (SRAM), wherein the processor, the queue manager hardware, the SRAM, and the DMA controller are all part of the same integrated circuit.

22. The method of claim 19, wherein each of the values on the DMA command queue is a DMA command.

23. The method of claim 19, wherein each of the values on the DMA command queue comprises a pointer to a DMA command.

24. The method of claim 19, wherein each of the values on the DMA command queue is a number that identifies a location where a DMA command is stored.

25. The method of claim 19, wherein the network interface device is an expansion card coupled to a host computer, the host storage being part of the host computer.

26. The method of claim 19, wherein the network interface device is a part of a host computer.

27. A method, comprising:

(a) maintaining on a network interface device a DMA command queue, the DMA command queue being maintained by queue manager hardware on the network interface device;

(b) a processor on the network interface device causing a value to be pushed onto the DMA command queue, the value being indicative of corresponding DMA command;

(c) popping a value off the DMA command queue, a DMA controller on the network interface device then executing a DMA command indicated by the popped value;

(d) repeating (b) and (c) such that a first portion of data is transferred from a first place on the network interface device to a second place on the network interface device, and such that a second portion of data is transferred from the first place on the network interface device to the second place on the network interface device;

(e) maintaining a DMA command complete queue on the network interface device, the DMA controller pushing values onto the DMA command complete queue, the processor popping values off the DMA command complete queue;

(f) after both the first portion and the second portion have been transferred to the second place in (d), the processor taking a software branch; and (g) after taking the software branch, the processor outputting the first and second portions of data from the network interface device.

28. The method of claim 27, wherein the processor outputs the first and second portions of data in (f) to a network.

29. The method of claim 27, wherein the processor outputs the first and second portions of data in (f) to a host computer.

30. The method of claim 27, wherein the first place is a dynamic random access memory (DRAM) and wherein the second place is a bus interface.

31. The method of claim 27, wherein the first place is a bus interface and wherein the second place is a dynamic random access memory (DRAM).

32. The method of claim 27, wherein the first place is a bus interface and wherein the second place is a static random access memory (SRAM).

33. The method of claim 27, wherein the first place is a static random access memory (SRAM) and wherein the second place is a bus interface.

* * * * *